(12) United States Patent
Khorasani

(10) Patent No.: US 10,074,159 B2
(45) Date of Patent: Sep. 11, 2018

(54) SYSTEM AND METHODOLOGIES FOR SUPER SAMPLING TO ENHANCE ANTI-ALIASING IN HIGH RESOLUTION MESHES

(71) Applicants: VOLKSWAGEN AG, Wolfsburg (DE); AUDI AG, Ingolstadt (DE)

(72) Inventor: George Allen Khorasani, San Mateo, CA (US)

(73) Assignees: VOLKSWAGEN AG (DE); AUDI AG (DE)

( * ) Notice: Subject to any disclaimer, the term of this patent is extended or adjusted under 35 U.S.C. 154(b) by 0 days.

(21) Appl. No.: 14/981,161

(22) Filed: Dec. 28, 2015

(65) Prior Publication Data

US 2017/0186136 A1 Jun. 29, 2017

(51) Int. Cl.
| | | |
|---|---|---|
| G06T 15/00 | (2011.01) | |
| G06T 3/40 | (2006.01) | |
| G06T 1/60 | (2006.01) | |
| G06T 1/20 | (2006.01) | |
| G06T 15/10 | (2011.01) | |

(52) U.S. Cl.
CPC .............. *G06T 3/4053* (2013.01); *G06T 1/20* (2013.01); *G06T 1/60* (2013.01); *G06T 15/00* (2013.01); *G06T 15/10* (2013.01); *G06T 2200/28* (2013.01); *G06T 2210/36* (2013.01)

(58) Field of Classification Search
None
See application file for complete search history.

(56) References Cited

U.S. PATENT DOCUMENTS

| | | | | |
|---|---|---|---|---|
| 2009/0033671 A1* | 2/2009 | Tuomi | ............... | G06T 11/40 345/545 |
| 2010/0013854 A1* | 1/2010 | Michail | ............... | G06T 11/40 345/615 |
| 2011/0317755 A1* | 12/2011 | Lancaster | ............ | H04N 19/132 375/240.01 |
| 2015/0138228 A1* | 5/2015 | Lum | ................ | G06T 15/503 345/611 |
| 2016/0292812 A1* | 10/2016 | Wu | ................ | G06T 1/20 |

OTHER PUBLICATIONS

Botsch et al.; A Robust Procedure to Eliminate Degenerate Faces from Triangle Meshes; VMV 2001; Nov. 23, 2001; pp. 1-7.
Frey; Generation and Adaptation of Computational Surface Meshes from Discrete Anatomical Data; International Journal for Numerical Methods in Engineering; Jun. 14, 2004; vol. 60, No. 6; pp. 1049-1074.
Wikipedia; Multisample Anti-Aliasing; Dec. 25, 2015; downloaded from https://en.wikipedia.org/w/index.php?title=Multisample_anti-aliasing&oldid=696715435.
Search Report and Written Opinion for International Patent Application No. PCT/EP2016/082256; dated Mar. 30, 2017.

* cited by examiner

*Primary Examiner* — Ryan D McCulley
(74) *Attorney, Agent, or Firm* — Barnes & Thornburg LLP

(57) ABSTRACT

Disclosed embodiments provide systems, components, and methodologies for performing super sampling in combination with other operations to enhance anti-aliasing in high resolution meshes generated by GPUs so as to mitigate, reduce or eliminate the effects of degenerated triangles so as to improve the appearance of simulated objects.

16 Claims, 5 Drawing Sheets

SYSTEM AND METHODOLOGIES FOR SUPER SAMPLING TO ENHANCE ANTI-ALIASING IN HIGH RESOLUTION MESHES

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

BACKGROUND

The present disclosure relates to systems, components, and methodologies for generating images in Graphics Processing Units (GPUs). In particular, the present disclosure relates to systems, components, and methodologies that improve anti aliasing in high resolution meshes generated by such GPUs.

SUMMARY

According to the present disclosure, systems, components, and methodologies are provided for performing super sampling to enhance anti-aliasing in high resolution meshes generated by GPUs.

According to at least one embodiment, super sampling is performed to mitigate, reduce or eliminate the effects of degenerated triangles.

According to at least one embodiment, super sampling in combination with other operations improves the appearance of simulated objects.

According to at least one embodiment, super sampling in combination with other mathematical operations is performed for every frame during rendering.

Additional features of the present disclosure will become apparent to those skilled in the art upon consideration of illustrative embodiments exemplifying the best mode of carrying out the disclosure as presently perceived.

BRIEF DESCRIPTION OF THE FIGURES

The detailed description particularly refers to the accompanying figures in which.

DETAILED DESCRIPTION

Figure 1:
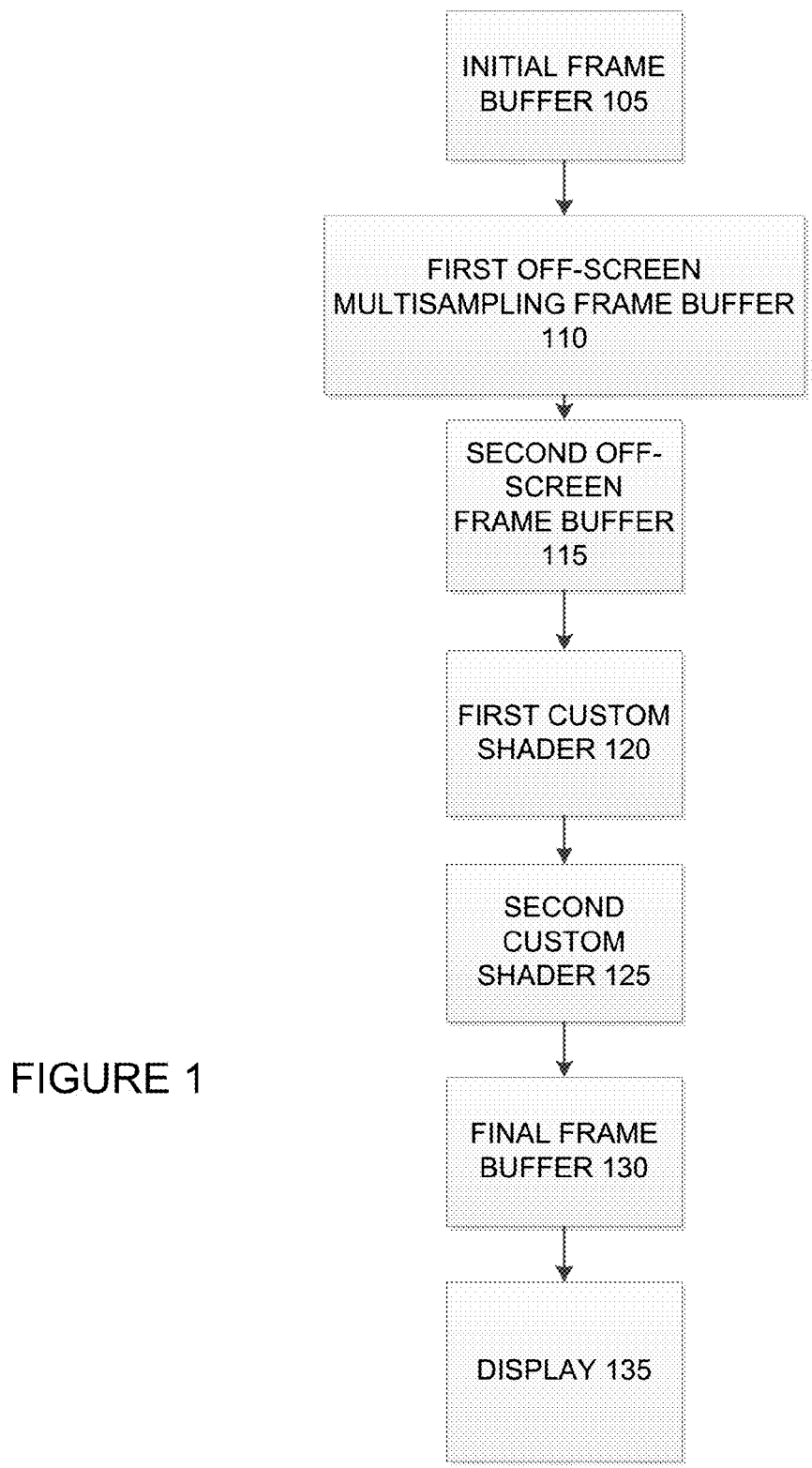
FIG. 1 is an example of components of a system providing enhanced anti-aliasing in high resolution meshes generated by GPUs using super sampling to mitigate, reduce or eliminate the effects of degenerated triangles.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Graphics Processing Units (GPUs), also referred to as Visual Processing Units (VPUs), are specialized electronic circuits designed to rapidly manipulate and alter memory to accelerate the creation of images in one or more frame buffers for output to a display.

One conventional software for creating computer images is OpenGL (Open Graphics Library) which is a cross-language, multi-platform Application Programming Interface (API) for rendering two dimensional (2D) and three dimensional (3D) vector graphics. The OpenGL API is conventionally used to interact with GPUs to make image rendering more efficient. Recently, the OpenGL API functionality was embedded in hardware systems as OpenGL for Embedded Systems (OpenGL-ES), for example, the nVidia Tegra K1 platform. Open GL-ES is designed for embedded GPU systems like smartphones, computer tablets, video game consoles, Personal Data Assistants (PDAs), in vehicle-head units, etc.

Creation of images using GPUs and the Open GL functionality requires creating an OpenGL context, implemented as a state machine that stores all data related to the rendering of an image by a software application. In this way, the GPUs generate and alter computer graphics and perform image processing on large blocks of visual data in parallel. Thus, GPUs also utilize a highly parallel structure that enables more efficient data processing than that possible with general-purpose Computational Processing Units (CPUs). Nevertheless, CPUs may include a GPU in a video card or embedded in motherboard for example.

Likewise, GPUs may be utilized in special purpose displays, for example, when Open GL-ES is used for embedded systems such as in special purpose computers within a vehicle, mobile phone or game console for 3D computer graphics and solid modeling. Moreover, the software used by such GPUs provides polygonal meshes that may be used for collision detection.

Conventionally, GPUs may use a polygon mesh that is a collection of vertices, edges and faces that defines the shape of an object. Although various types of simple convex and concave polygons may be used, the use of triangle meshes often improves computational efficiency by grouping a plurality of triangles (typically in three dimensions) that are connected by their common edges or corners into meshes. This is because operations may be performed on the vertices at the corners of the triangles. This is an improvement over operating on individual triangles because an operation may be performed on all the triangles that meet at a single vertex at the same time, thereby reducing computational workload. Nevertheless, GPUs require manipulation of the components of mesh triangles which include vertices, edges, and the triangles themselves.

However, one problem with triangle meshes is the occurrence of degenerated triangles, which can be conceptually thought of as a collapsed triangle. Degenerated triangles are a common problem in high resolution meshes, particularly around the edges of curved surfaces. More specifically, in order for a triangle to be rendered properly, three distinct vertices are needed. The vertices are the points from which shapes like triangles are constructed to render a 3D mesh. A polygon mesh is a collection of vertices, edges and faces that defines the shape of a polyhedral object in 3D computer graphics and solid modeling. The faces usually consist of triangles (triangle mesh), quadrilaterals, or other simple convex polygons, since this simplifies rendering. Each of the vertices is stored with certain attributes, for example, 3D position, color and texture coordinates. These vertices are transformed by a graphics card into polygons or primitives, for example, triangles.

In a high resolution mesh, floating point errors may cause two close vertices in a small or "thin" triangle to converge to a single point. As a result, a triangle form can be collapsed or changed from a 2D plane to a one dimensional (1D) line. This problem manifests itself in small artifacts or disconnected dots. This is a particular problem when light is applied to a generated mesh because application of lighting equations requires a surface to apply the light to rather than a line. More specifically, lighting equations require interpolation of color or normal along the vertices to create a smooth shading across the surface of the triangle.

Conventionally, this problem must be solved by direct manipulation of the mesh in a modelling software. This requires that the designer must remove some surfaces containing the small thin triangles, or generate a lower polygon model to avoid thin polygons. Alternatively, the designer must "merge" faces in order to remove the very tiny triangles. Either solution is a manual one and requires a time consuming process that also diminishes the final look of a mesh if the resolution is lowered or "problem" polygons are removed.

To the contrary, the disclosed embodiments utilize an ordered combination of super sampling, down-sampling and application of a Gaussian Blur filter to perform mesh clean up to minimize the appearance of artifacts resulting from degenerated triangles.

Conventional GPUs have used super sampling as a spatial anti-aliasing method to improve image quality by removing jagged and/or pixelated edges from generated images. However, such anti-aliasing techniques are meant to remove artifacts that stem from the problem that real world objects have continuous smooth surfaces, whereas computer generated images must be rendered using pixels each having a specific color. Thus, rendering of a curved line in an image is merely a collection of pixels of a particular color provided relative to one another to give the impression of a curve. Nevertheless, at some level of resolution, the impression fails because the relationships between the pixels can only be horizontal or vertical, not diagonal.

Interestingly, because the number of samples determines the quality of the output image, the sampling must increase to achieve a higher image quality. Thus, conventional super sampling has long been considered to be computationally expensive because it requires increased memory. This is because the size of a necessary memory buffer is several times larger than what would be needed for an image of a particular size. As a result, the conventional thinking has been that super sampling is an obsolete and unuseful technique for anti-aliasing.

In fact, as a conventional alternative, conventional GPUs have utilized a slightly different approach called multi sampling. Nevertheless, one deficiency of multi sampling is that it can remove data used to convey lighting, shading and textures from the sampling process so that only the color data of an image is sampled and blended. In this way, multi sampling is more efficient; however, the quality of the rendered image is deteriorated. Thus, although multi sampling is generally known to be inferior to super sampling in effect, it has been widely adopted, in particular for embedded GPU systems, because it requires far less computational effort.

Contrary to these conventional approaches to anti-aliasing, the disclosed embodiments use a combination of the anti-aliasing techniques to cosmetically clean up the effects of degenerated triangles in a mesh. Thus, the two conventional anti-aliasing techniques which were conventionally thought to be alternatives to one another (with one being obsolete based on the other) have been determined in the present disclosure to be complimentary to one another so as to enable further enhancement of the resulting image rendering.

Thus, the disclosed embodiments utilize super sampling on a triangle mesh to eliminate the effects of artifacts resulting from degenerated triangles. This differs from conventional super sampling techniques which merely resolved aliasing (i.e., jagged lines). By using super sampling in combination with down-sampling and application of a Gaussian Blur filter, in accordance with the disclosed embodiments, a resulting graphic is enhanced by hiding the artifacts related to degenerated triangles.

In accordance with disclosed embodiments, and as disclosed in FIG. 1, a plurality of off-screen buffers are used including a first off-screen multisampling frame buffer 110 and a second off-screen frame buffer 115. When rendering a frame, results are stored in these off-screen buffers (also known as back buffers) to ensure that a user viewing the rendered images only sees a final result. Thus, in operation, an initial frame of a scene may be rendered from an initial frame buffer 105 into the first off-screen multisampling buffer 110. The first off-screen multisampling frame buffer 110 may be, for example, twice the size of the initial frame buffer.

The size and type of the initial frame buffer 105 may be set based on the software application that has generated the image data in the initial frame buffer 105. Thus, for example, the first off-screen multisampling frame buffer 110 may be a 512×512 4× multisampling with a 16 bit depth buffer. However, it should be understood that the only constraint on the first off-screen multisampling frame buffer 110 is that it be approximately twice the size of the initial frame buffer 105.

Rendering the frame in a buffer that is twice the size of the initial frame buffer 105 is referred to as super sampling the frame image because the image is then rendered at a much higher resolution than the initial frame buffer. Likewise, the image included in the first off-screen frame buffer 110 is a much higher resolution than the rendered image that will be displayed because the initial frame buffer 105 and the final frame buffer 130 are the same size.

Subsequently, the data of the first off-screen multi-sampling frame buffer 110 is down sampled into the second off-screen frame buffer 115 using a first custom shader 120. This operation reduces the image size to render an image with smoother transitions. This enables sampling (or collecting) the colors of a plurality of pixels to blend them to create a smoother image at the lower resolution of the second off-screen frame buffer 115.

Subsequently, the data in the second off-screen frame buffer 115 is Bit Block Transferred (BLIT), which is a computer graphics operation in which several bitmaps are combined into one) and a Gausssian Blur filter is applied to it by a second custom shader 125 so as to render the frame data into the final frame buffer 130. Subsequently, the cleaned up data may be output to a display for viewing by a user.

The Gaussian Blur filter performs Gaussian smoothing on the frame image data as the result of blurring then image using a Gaussian function. The use of Gaussian Blur filters is conventionally known to reduce image noise. However, in the context of the presently disclosed embodiments it serves to further reduce the visual impact of artifacts of degenerated triangles. In at least one embodiment, the down sampling of the image into the final frame buffer 135 (also known as a screen buffer, video buffer, or regeneration buffer) to smooth out edges and further remove artefacts from the degenerated triangles may be performed simultaneously with the application of a blur filter, e.g., a small 2×2 Gaussian blur filter, to the image to remove color inconsistencies due to lighting calculations. This smooths discontinuities so at to provide an improved appearance to the rendered image.

Both the first and second custom shaders 120, 125 maybe implemented as software for instructing a graphics card what to do with data during rendering. Such shaders may be written in a C-style language called OpenGL Shading Language (GLSL). Examples of the first and second shader software for shaders 120 and 125 are provided in the attached Appendices A and B.

The additional frame buffers 110 and 115 may be generated using OpenGL framebuffer objects. The additional frame buffers occupy video memory and are implemented as an area in memory that can be rendered to. In that regard, the hardware implementation for the components of the device 100 is limited that there must be enough memory to provide an off-screen multisampling buffer 110 that is twice the size of an initial frame buffer 105.

In accordance with the disclosed embodiments, first off-screen multisampling frame buffer 110 may be used to enhance the anti-aliasing of the scene over and above the hardware anti-aliasing performed using super sampling. In this way, in accordance with disclosed embodiments, the mesh clean up may be performed in combination with multi sampling anti-aliasing.

Figure 2:
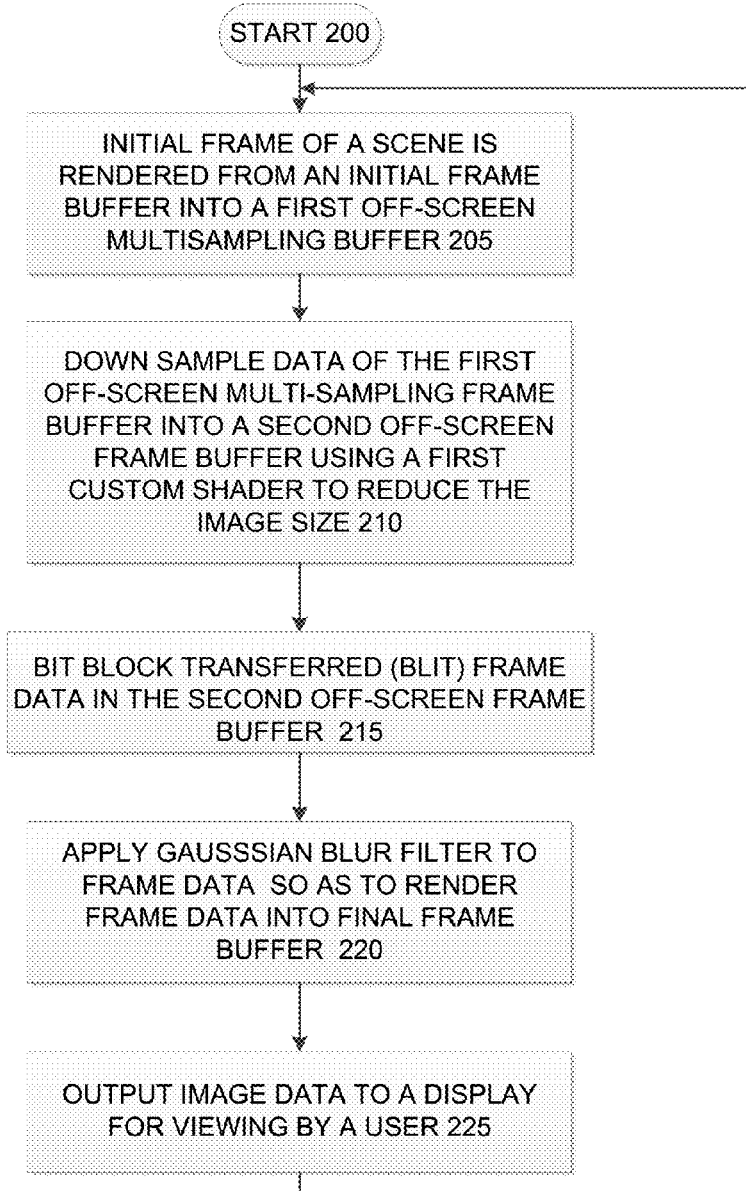
FIG. 2 is an example of operations performed for providing enhanced anti-aliasing in high resolution meshes generated by GPUs using super sampling to mitigate, reduce or eliminate the effects of degenerated triangles.

FIG. 2 illustrates operations that may be performed by a special purpose computer, e.g., a GPU, included in a computer, for example, an in vehicle-head unit. As illustrated in FIG. 2, the process operations begin at 200 and control proceeds to 205 at which an initial frame of a scene is rendered from an initial frame buffer into a first off-screen multisampling buffer, e.g., one that is approximately twice the size of the initial frame buffer. Control then proceeds to 210, at which the data of the first off-screen multi-sampling frame buffer is down sampled into a second off-screen frame buffer using a first custom shader so as to reduce the image size to render an image with smoother transitions and enable sampling the colors of a plurality of pixels to blend them to create a smoother image at the lower resolution of the second off-screen frame buffer.

Control then proceeds to 215, at which the data in the second off-screen frame buffer is Bit Block Transferred (BLIT). Control then proceeds to 220, at which a Gausssian Blur filter is applied to it by a second custom shader 125 so as to render the frame data into the final frame buffer. In at least one embodiment, the down sampling of the image into the final frame buffer may be performed simultaneously with the application of the Gaussian blur filter.

Control then proceeds to 225, at which the image data is output to a display for viewing by a user.

The operations performed in FIG. 2 are performed for each frame of an image to be rendered. As a result, following operations at 225, the process operations return to operations at 205 for a next image frame to be rendered.

Optionally, the rendered result in the final frame buffer may be the subject of additional operations, such as various post-processing operations.

Figure 3:
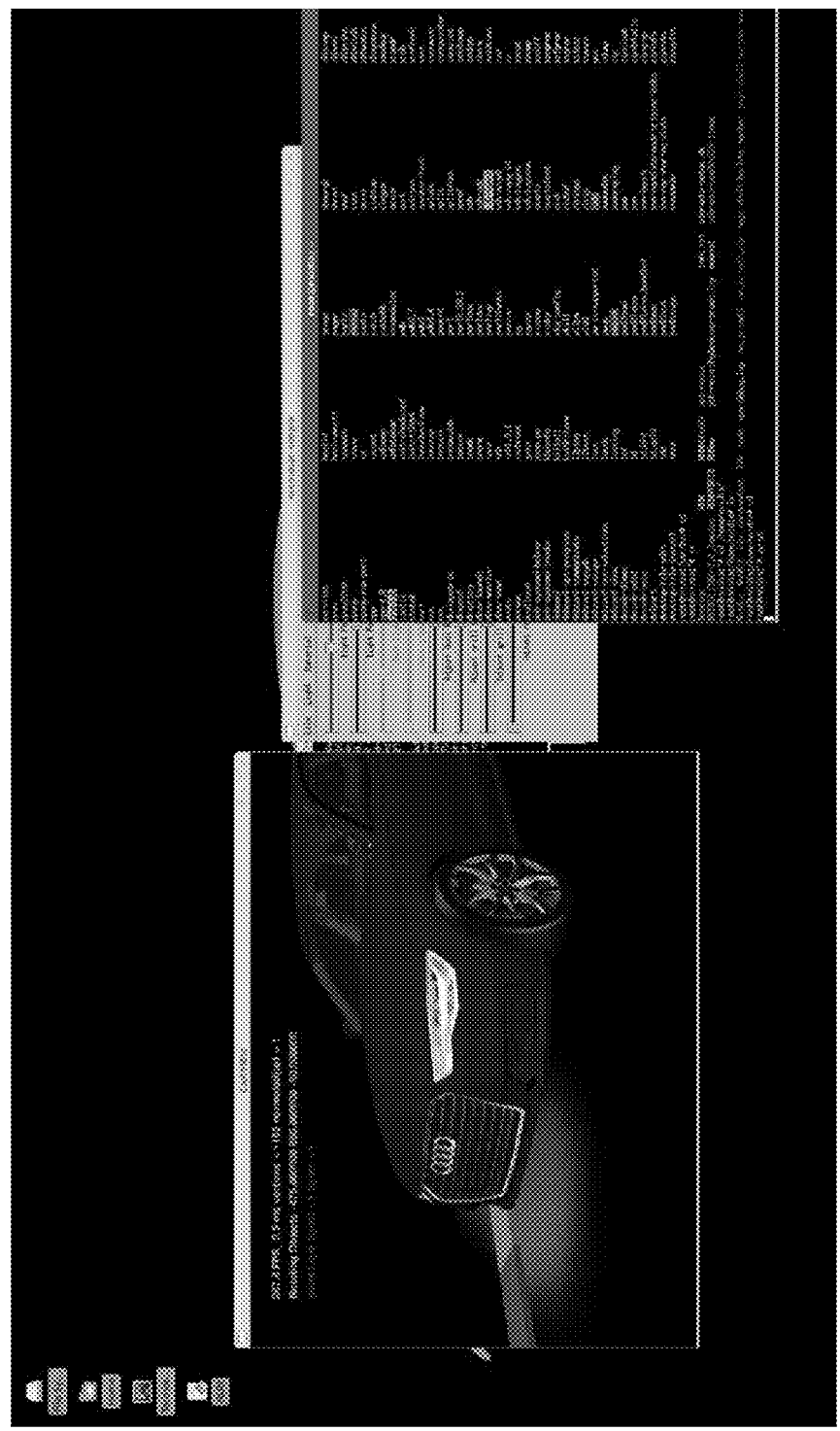
FIGS. 3-6 illustrate the technical effect on the field of 3D imaging rendering of a vehicle image rendered on a nVidia Tegra K1 platform.
Figure 4:
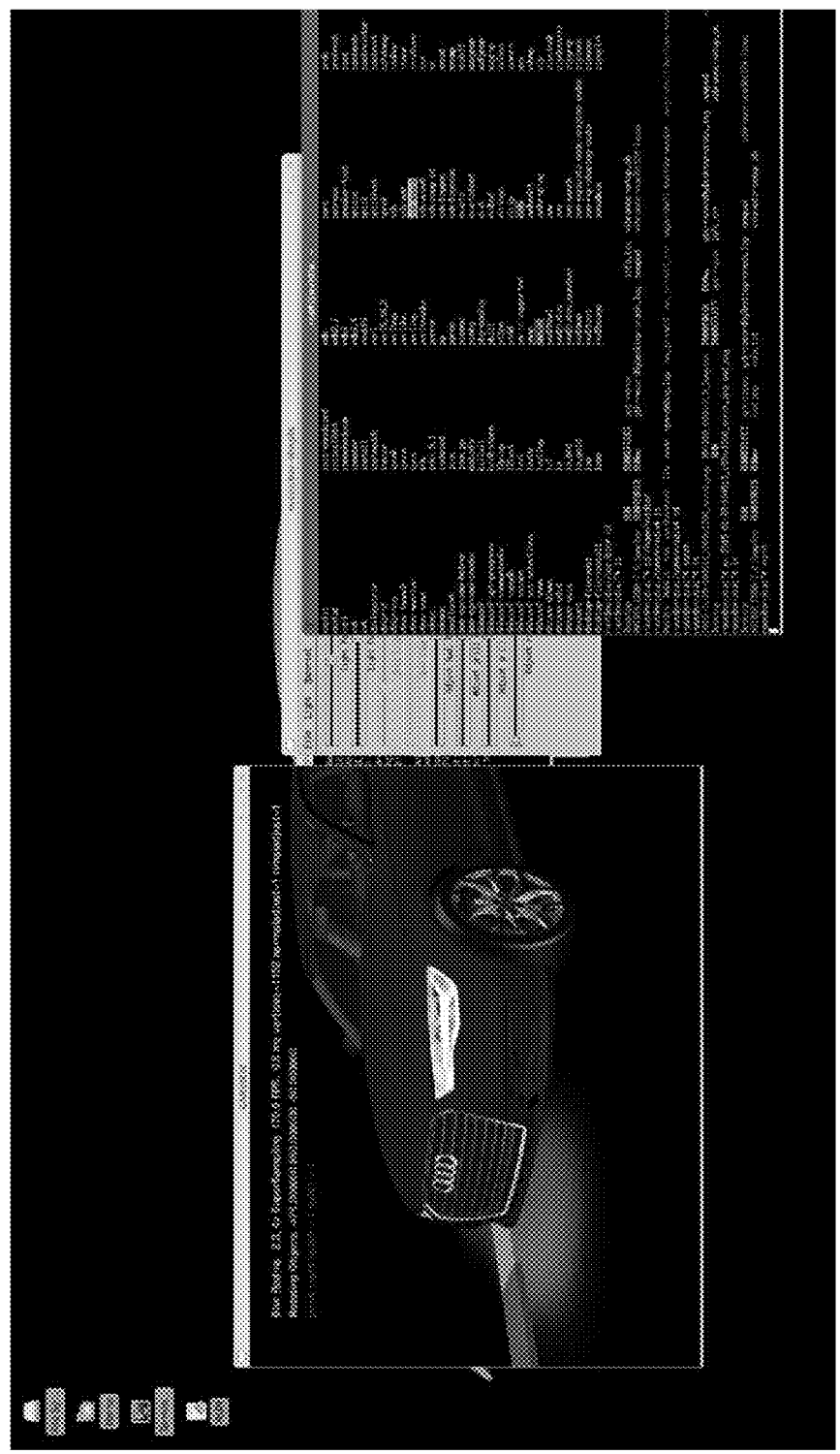
Figure 5:
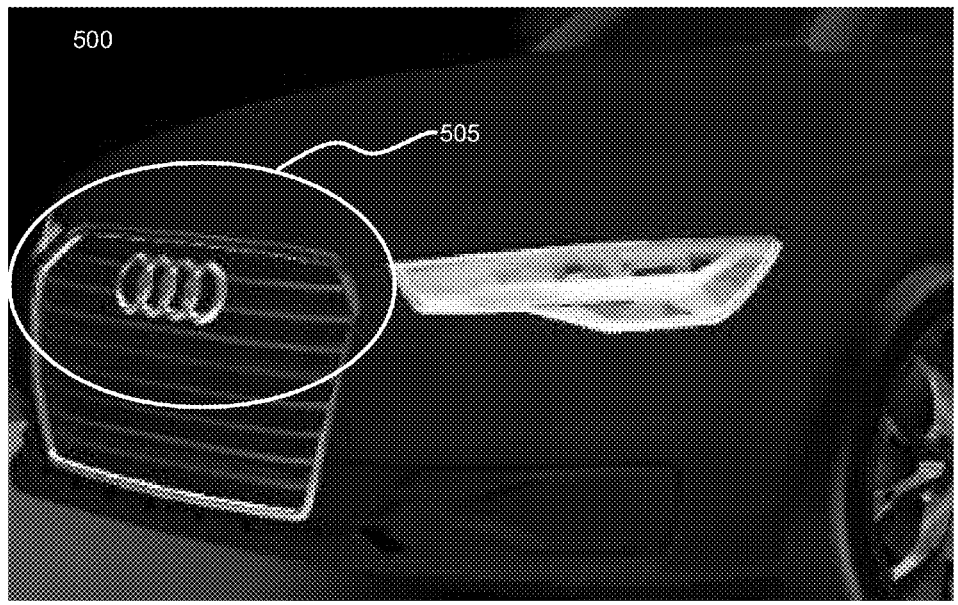
Figure 6:
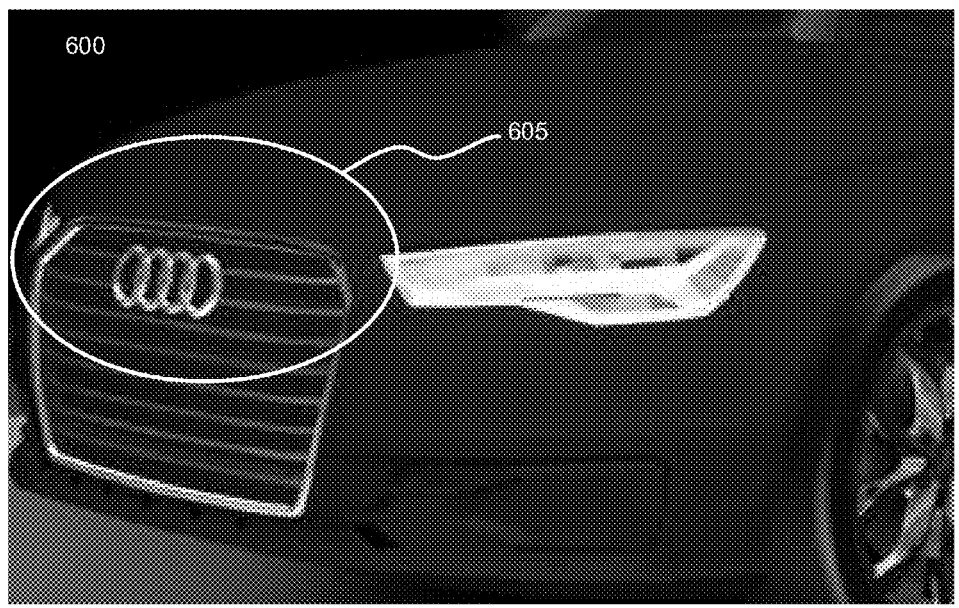

As shown in FIGS. 3-6, the technical effect on the field 3D imaging rendering is apparent. Those figures were rendered on a nVidia Tegra K1 platform, as illustrated in FIGS. 3-4. As shown in those figures, they depict identical scenes. However, FIGS. 3 and 5 show the rendered scene using a GPU 4× sample. FIGS. 4 and 6 show the scene rendered using super sampling performed on top of (in conjunction with) a GPU 4× multi sample. As can be clearly seen in FIG. 5, the image 500 includes a number of areas 505, in which artifacts are generated as a result of degenerated triangles. To the contrary, as illustrated in image 600 illustrated in FIG. 6, the artifact areas and their effects are significantly reduced. Moreover, as illustrated in comparison between areas 500 and corresponding areas 600 in FIGS. 5 and 6, the combined effect of 4× multi sampling and super sampling also achieves improved quality anti-aliasing.

The above-described components may be implemented in software, compiled and stored to a memory as object code, and during operation of the vehicle, may be invoked for execution by one or more processors. In one implementation, the above-described components may be implemented as a single system on a chip. The interconnections among the above-described components can be provided through any suitable electronic communication mechanism, such as a communication bus. Whether implemented as one chip module or multiple chip modules, the system 100 may be provided, for example, within a vehicle head unit so as to provide output image data to a display that is part of or coupled to a vehicle infotainment system. As a result, the components may be located behind a dashboard near other electronic circuitry. Such a location may be beneficial for providing convenient access to a power source, and to the electronic systems controlling the vehicle's driving.

Although certain embodiments have been described and illustrated in exemplary forms with a certain degree of particularity, it is noted that the description and illustrations have been made by way of example only. Numerous changes in the details of construction, combination, and arrangement of parts and operations may be made. Accordingly, such changes are intended to be included within the scope of the disclosure, the protected scope of which is defined by the claims.

The invention claimed is:

1. A system for rendering a computer generated image, the system comprising:
   one or more processors operatively coupled to one or more non-transitory storage devices on which is stored executable computer code, which when executed by the one or more processors causes the system to render the computer generated image that comprises vertices of triangles constructed to render a 3D mesh, wherein the 3D mesh provides a surface from the rendered triangles, wherein one or more light equations are applied to the surface provided by the 3D mesh;
   a display operatively connected to at least one of the one or more processors for displaying the computer generated image; and
   means for performing combined sampling wherein the combined sampling includes super sampling in combination with down sampling to remove color inconsistencies due to the application of the one or more light equations to the surface provided by the 3D mesh to reduce visual impact of artifacts of degenerated triangles to improve the appearance of the computer generated image when output to and shown on the display, wherein the means for performing combined sampling includes:
an initial frame buffer for storing frame image data;
a first off-screen multisampling buffer that is coupled to the initial frame buffer and twice as large as the initial frame buffer,
a final frame buffer that is coupled to the first-off-screen multisampling buffer and is the same size as the initial frame buffer, and
a Gaussian Blur filter that performs a Bit Block Transfer so as to render the frame image data into the final frame buffer, wherein, in the means for performing combined sampling, the down sampling to remove color inconsistencies is performed simultaneously with application of the Gaussian blur filter to perform the Bit Block Transfer.

2. The system of claim 1,
wherein rendering frame image data in the initial frame buffer into the first off-screen multisampling buffer super samples the frame image data so as to render the frame image data at higher resolution.

3. The system of claim 2, wherein the means for performing combined sampling further includes:
a first shader; and
a second off-screen frame buffer,
wherein the first shader down samples the frame image data in the first off-screen multi-sampling frame buffer so as to render the down sampled frame image data into the second off-screen frame buffer.

4. The system of claim 3, wherein the down sampling of the frame image data into the second off-screen frame buffer reduces image size to render the frame image data as an image with smoother transitions.

5. The system of claim 4, wherein the frame image data in the final frame buffer is output to the display for showing the image with smoother transitions.

6. A method for rendering a computer generated image on a display, the method comprising:
rendering of frame image data from an initial frame buffer into a first off-screen multisampling buffer, wherein the first off-screen multisampling buffer is twice the size of the initial frame buffer so as to perform super sampling;
down sampling the frame image data of the first off-screen multi-sampling frame buffer into a second off-screen frame buffer;
Bit Block Transferring the frame image data of the second off-screen frame buffer so as to render the frame image data into a final frame buffer, wherein the final frame buffer is the same size as the initial frame buffer;
outputting the frame image data from the final frame buffer to the display to render the computer generated image that comprises vertices of triangles constructed to render a 3D mesh on the display, wherein the 3D mesh provides a surface from the rendered triangles; and
applying one or more light equations to the surface provided by the 3D mesh,
wherein the combined, ordered combination of rendering, down sampling and Bit Block Transferring performs combined sampling wherein the combined sampling includes the super sampling in combination with the down sampling to remove color inconsistencies due to the application of the one or more light equations to the surface provided by the 3D mesh to reduce visual impact of artifacts of degenerated triangles to improve the appearance of the computer generated image when output to and shown on the display,
wherein the initial frame buffer stores the frame image data, the first off-screen multisampling buffer is coupled to the initial frame buffer and twice as large as the initial frame buffer, the final frame buffer is coupled to the first-off-screen multisampling buffer and is the same size as the initial frame buffer,
wherein the Bit Block transfer is performed using a Gaussian Blur filter so as to render the frame image data into the final frame buffer, and
wherein, in the combined, ordered combination of rendering, down sampling and Bit Block Transferring, the down sampling to remove color inconsistencies is performed simultaneously with application of the Gaussian blur filter to perform the Bit Block Transfer.

7. The method of claim 6, wherein rendering frame image data of the initial frame buffer into the first off-screen multisampling buffer super samples the frame image data so as to render the frame image data at higher resolution.

8. The method of claim 6, further comprising down sampling the frame image data into the first off-screen multi-sampling frame buffer using a first shader so as to render the down sampled frame image data into the second off-screen frame buffer.

9. The method of claim 8, wherein the down sampling of the frame image data into the second off-screen frame buffer reduces image size to render the frame image data as an image with smoother transitions.

10. The method of claim 6, wherein the Bit Block Transfer performed by the Gaussian Blur Filter renders the frame image data into the final frame buffer.

11. The method of claim 6, wherein the frame image data in the final frame buffer is output to the display for showing the image with smoother transitions.

12. An in-vehicle system for rendering a computer generated image on an in-vehicle display, the system comprising:
a processor and a non-transitory data storage on which is stored computer code which, when executed on the processor, causes the in-vehicle system to:
rendering of frame image data from an initial frame buffer into a first off-screen multisampling buffer, wherein the first off-screen multisampling buffer is twice the size of the initial frame buffer so as to perform super sampling;
down sampling the frame image data of the first off-screen multi-sampling frame buffer into a second off-screen frame buffer using a first shader;
Bit Block Transferring the frame image data of the second off-screen frame buffer so as to render the frame image data into a final frame buffer, wherein the final frame buffer is the same size as the initial frame buffer;
outputting the frame image data from the final frame buffer to the display to render the computer generated image that comprises vertices of triangles constructed to render a 3D mesh on the display, wherein the 3D mesh provides a surface from the rendered triangles; and
applying one or more light equations to the surface provided by the 3D mesh, wherein the combined, ordered combination of rendering, down sampling and Bit Block Transferring performs combined sampling wherein the combined sampling includes the super sampling in combination with the down sampling to remove color inconsistencies due to the application of the one or more light equations to the surface provided by the 3D mesh to reduce visual impact of artifacts of degenerated triangles to improve the appearance of the computer generated image when output to and shown on the display, wherein the initial frame buffer stores the frame image data, the first off-screen multisampling buffer is coupled to the initial frame buffer and twice as large as the initial frame buffer, the final frame buffer is coupled to the first-off-screen multisampling buffer and is the same size as the initial frame buffer, wherein the Bit Block transfer is performed using a Gaussian Blur filter so as to render the frame image data into the final frame buffer, and wherein, in the combined, ordered combination of rendering, down sampling and Bit Block Transferring, the down sampling to remove color inconsistencies is performed simultaneously with application of the Gaussian blur filter to perform the Bit Block Transfer.

13. The in-vehicle system of claim 12, wherein rendering frame image data of the initial frame buffer into the first off-screen multisampling buffer super samples the frame image data so as to render the frame image data at higher resolution.

14. The in-vehicle system of claim 12, stored computer code further includes instructions for down sampling the frame image data into the first off-screen multi-sampling frame buffer so as to render the down sampled frame image data into the second off-screen frame buffer.

15. The in-vehicle system of claim 14, wherein the down sampling of the frame image data into the second off-screen frame buffer reduces image size to render the frame image data as an image with smoother transitions.

16. The in-vehicle system of claim 12, wherein the Bit Block Transferring performed by the Gaussian Blur filter renders the frame image data into the final frame buffer.

* * * * *